(12) United States Patent
Haga

(10) Patent No.: US 7,201,516 B2
(45) Date of Patent: Apr. 10, 2007

(54) FLUID BEARING DEVICE

(75) Inventor: Tomohiro Haga, Ozu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/972,495

(22) Filed: Oct. 26, 2004

(65) Prior Publication Data
US 2005/0111769 A1   May 26, 2005

(30) Foreign Application Priority Data
Nov. 21, 2003  (JP) ............................. 2003-391535

(51) Int. Cl.
*F16C 32/06* (2006.01)
*F16C 33/74* (2006.01)
(52) U.S. Cl. ....................... 384/100; 384/132
(58) Field of Classification Search ................ 384/119, 384/130, 132
See application file for complete search history.

(56) References Cited

U.S. PATENT DOCUMENTS 5,423,612 A * 6/1995 Zang et al. ................. 384/119
5,427,456 A * 6/1995 Hensel ......................... 384/112
5,667,309 A   9/1997 Nose ............................ 384/132
5,765,952 A * 6/1998 Dekker et al. .............. 384/132
6,296,391 B1 * 10/2001 Hayakawa et al. ......... 384/119
6,860,636 B2 * 3/2005 Takahashi ................... 384/119
6,890,104 B2 * 5/2005 Gomyo et al. .............. 384/119
2003/0161558 A1 * 8/2003 Kishi .......................... 384/107

FOREIGN PATENT DOCUMENTS

JP           2937833          6/1999

* cited by examiner

Primary Examiner—Thomas R. Hannon
(74) Attorney, Agent, or Firm—Steptoe & Johnson LLP

(57) ABSTRACT

A fluid bearing device capable of preventing a lubricant from scattering outward even during rotation thereof, while holding a relatively large amount of lubricant at a seal surface portion. A lubricant is filled between a sleeve and a shaft, a seal surface portion is formed on the sleeve in a location facing an open end thereof, the seal surface portion has a sectional shape defined by a plurality of inclined surfaces, and an inclination angle α of the inclined surface of the seal surface portion adjacent a radial bearing portion with respect to a shaft axis is formed to be larger than an inclination angle β of the inclined surface of the seal surface portion distant away from the radial bearing portion with respect to the shaft axis.

5 Claims, 7 Drawing Sheets

FLUID BEARING DEVICE

FIELD OF THE INVENTION

The present invention relates to a fluid bearing device suitable for a spindle motor of a hard disk device or the like. The fluid bearing device of the present invention is suitable as fluid bearing devices for motors of a video tape recorder and the like, in addition to a spindle motor of a hard disk device and so forth. Further, the fluid bearing device of the present invention can be used as a bearing for supporting other rotary parts.

BACKGROUND OF THE INVENTION

With an increase in capacity of a hard disk device of recent years, a number of fluid bearing devices, which are more excellent in rotational accuracy than a ball bearing and excellent in noiselessness, are being used as bearing devices for spindle motors of hard disk devices and the like, in place of ball bearing devices conventionally used.

In this type of conventional fluid bearing device, as schematically shown in FIG. 8 and FIG. 9, a hub 52 to which a magnetic disk is fixed is mounted to a sleeve 51 having an insertion hole in a center part, and a shaft 54 driven to rotate by a spindle motor part 53 is inserted into the sleeve 51 via a predetermined clearance. A lubricant 55 is filled in the clearance between the shaft 54 and the sleeve 51. A radial bearing portion 56 comprises a dynamic pressure generating groove in a herringbone shape or the like which is formed on at least one of surfaces opposing to each other of an outer peripheral surface of the shaft 54 and an inner peripheral surface of the sleeve 51, and the lubricant 55 is also filled in this radial bearing portion 56. When the shaft 54 is driven to rotate by the spindle motor part 53, pressure is applied to the lubricant 55 due to oil feeding action of the dynamic pressure generating groove of the radial bearing portion 56, so that the shaft 54 is rotatably supported with the sleeve 51 in the posture having a predetermined amount of clearance.

In a location of the outer peripheral portion in the shaft 54, which faces an open end 57, a seal surface portion 58 is formed by being notched toward the side of a shaft axis X to have a larger clearance than the part of the radial bearing portion 56, and the lubricant 55 is also stored in the clearance between the seal surface portion 58 and the sleeve 51 even during the bearing device is being driven to rotate. Since a relatively large amount of lubricant 55 can be stored in the location provided with this seal surface portion 58, even when the amount of lubricant 55 reduces as a part of the lubricant 55 evaporates or the like, the lubricant 55 stored in the seal surface portion 58 flows into the radial bearing portion 56 by capillarity action, and the radial bearing portion 56 is always kept in the state filled with the lubricant 55 so that bearing performance is kept favorable.

Hard disk devices including those using a spindle motor or the like having this kind of fluid bearing device have been desired to be reduced in size so that they can be accommodated in smaller spaces. This requires reduction in sizes of the spindle motor and therefore the fluid bearing device.

However, in the structure in which the seal surface portion 58 is formed by notching the outer peripheral portion of the shaft 54 toward the shaft axis X as shown in the above-described FIG. 9, the sectional area of the surface of the shaft 54 itself, which is orthogonal to the shaft axis X, is small, and therefore the holding capacity of the lubricant 55 in the seal surface portion 58 formed by notching the shaft 54 cannot be sufficiently large. As a result, when the diameter of the shaft 54 is small, such a phenomenon becomes more remarkable, and a sufficient amount of the lubricant 55 may not be held.

When the outer peripheral portion of the shaft 54 is largely notched in order to increase the lubricant-holding capacity in the seal surface portion 58, the substantial shaft diameter of the shaft 54 in this location becomes extremely small, thus causing the disadvantage of reducing the shaft strength for supporting the hub 52 and the like.

In order to overcome such problem, there exists the fluid bearing device in which a seal surface portion 61 is not formed at the shaft 54, but is formed at an inner peripheral portion facing the open end 57 in the sleeve 51 as shown in FIG. 10, and this kind of fluid bearing device is disclosed in, for example, Japanese Patent No. 2937833 and so on. In this case, the seal surface portion 61 has its sectional shape in which a clearance from the shaft 54 is made by only one inclined surface which widens toward the open end 57. According to this, the seal surface portion 61 is formed at the inner peripheral portion of the sleeve 51 which is larger in diameter than the outer peripheral portion of the shaft 54, and therefore as compared with the case in which the seal surface portion 61 is formed at the outer peripheral portion of the shaft 54, the seal surface portion 61 capable of storing a larger amount of lubricant 55 can be provided. Since the shaft 54 needs not be notched, the shaft 54 can keep its diameter so that the shaft strength for supporting the hub 52 or the like is not reduced.

However, when the structure of the conventional fluid bearing device as shown in FIG. 10 is adopted, a small inclination angle θ1 of the inclined surface forming the seal surface portion 61 with respect to the shaft axis X (in FIG. 10, the intersecting portion of the inclined surface forming the seal surface portion 61 and the shaft axis X is outside the drawing, and therefore depicted instead is the equivalent inclination angle θ1 with respect to the axis line which is parallel to the shaft axis X) require a relatively large dimension L1 as the length in the axial direction of the seal surface portion 61, in order to hold a large amount of lubricant 55. And therefore, the dimension allowed for the radial bearing portion 56 becomes small correspondingly, thus reducing the bearing rigidity. Especially, when the length of the shaft 54 itself is small as a result of reduction in size, it is difficult to form the seal surface portion 61 which can hold a sufficient amount of lubricant.

On the other hand, if an inclination angle θ2 of the inclined surface forming the seal surface portion 61 with respect to the shaft axis X is made large, as shown in FIG. 11, a large amount of lubricant 55 can be held even if a dimension L2 in the axial direction that is allowed to form the seal surface portion 61 is small, but when the shaft 54 and the like of the fluid bearing device are driven to rotate, the lubricant 55 concomitantly generates a circling flow and easily scatters outside from the seal surface portion 61 by centrifugal force. If the lubricant 55 leaks outside, there may be a threat that the lubricant 55 in the radial bearing portion 56 becomes insufficient or the hub and the like become contaminated.

DISCLOSURE OF THE INVENTION

The present invention is to solve the above-described problems, and has an object to provide a fluid bearing device capable of preventing a lubricant from scattering outside even during the bearing device is being driven to rotate, while holding a relatively large amount of lubricant at a seal surface portion.

In order to solve the above-described problems, the fluid bearing device of the present invention comprises a sleeve, a shaft inserted into the sleeve via a predetermined clearance, a radial bearing portion for allowing the sleeve to rotatably support the shaft, a lubricant filled in the clearance between the sleeve and shaft including a location of the radial bearing portion, and a seal surface portion formed in the sleeve a location facing an open end thereof, and having a larger clearance around the shaft than at the radial bearing portion, the clearance around the shaft being filled with the lubricant, wherein the seal surface portion has a sectional shape defined by a plurality of inclined surfaces including an adjacent inclined surface to the radial bearing portion and at least one distant inclined surface from the radial bearing portion, wherein the adjacent inclined surface forms an inclination angle with respect to the shaft axis, and the distant inclined surface forms an inclination angle with respect to the shaft axis, the former angle being larger than the latter angle.

According to this constitution, a large amount of lubricant can be held as compared with the case in which the entire seal surface portion is constructed by a single inclined surface having the same inclination angle as the inclination angle of the distant inclination surface, and the depth of the seal surface portion from the open end can be made small, Thus, it is possible to take a sufficient length dimension of the radial bearing portion. In addition, the inclination angle of the distant inclined surface formed adjacent to the open end than the inclined surface adjacent to the radial bearing portion is formed to be smaller, so that the lubricant can be prevented from scattering outside even during the bearing device is being driven to rotate.

At least part of a connecting portions, which are respectively formed between the radial bearing portion and the inclined surface adjacent to the radial bearing portion, between the inclined surface adjacent to the radial bearing portion and the distant inclined surface, and between the distant inclined surface and a sleeve end surface, may have a gently-sloping sectional shape. According to this, burrs can be prevented from occurring in the connecting portions in the cutting process of producing the sleeve. Thus, the reliability of the bearing device is enhanced.

A cover for covering an opening of the seal surface portion is fitted on an end surface of the sleeve, so that the lubricant can be more reliably prevented from scattering outside.

DESCRIPTION OF THE EMBODIMENTS

Hereinafter, embodiments of the present invention will be explained based on the drawings.

In an embodiment of the present invention shown in FIG. 1 to FIG. 6, the case in which a fluid bearing device is used as a spindle motor of a hard disk device is described, but the present invention is not limited to this.

Figure 1:
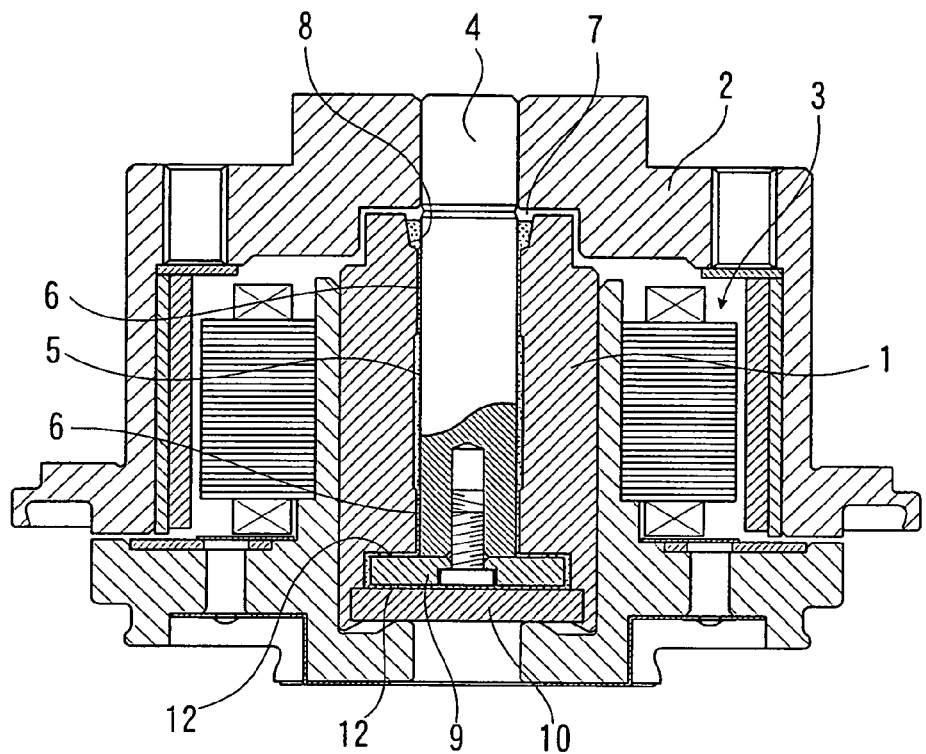
FIG. 1 is a cross-sectional front view of a fluid bearing device according to a first embodiment of the present invention.
Figure 2:
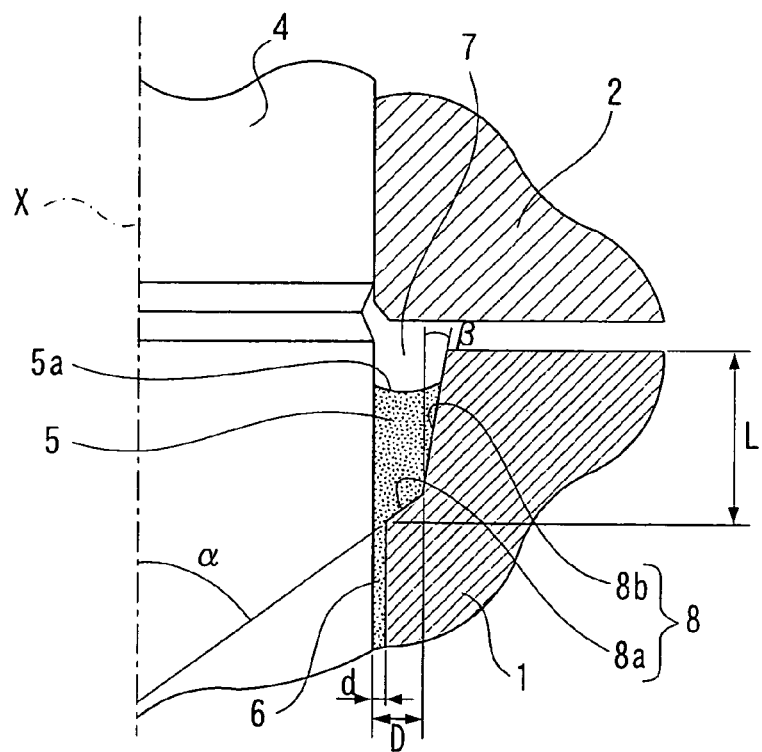
FIG. 2 is a partial cross-sectional front view of the fluid bearing device according to the first embodiment of the present invention.

As schematically shown in FIG. 1 and FIG. 2, in this fluid bearing device, a hub 2 to which a magnetic disk is fixed is mounted to a sleeve 1 having an insertion hole in a center portion, a shaft 4 driven to rotate by a spindle motor portion 3 is inserted into the sleeve 1 via a predetermined clearance, and a lubricant 5 is filled in the clearance between the shaft 4 and the sleeve 1. A dynamic pressure generating groove in a herringbone shape or the like is formed on at least one of an outer peripheral surface of the shaft 4 and an inner peripheral surface of the sleeve 1 in the surfaces opposing to each other to construct radial bearing portions 6, and the lubricant 5 is filled in the clearance including the locations of the radial bearing portions 6. In this embodiment, the radial bearing portions 6 are provided respectively in two locations that are an inner location and a location adjacent to an opening between the shaft 4 and the sleeve 1.

A thrust flange 9 with a larger diameter than the shaft 4 is mounted to an end portion of the shaft 4, a thrust plate 10 is fixed to the sleeve 1 so as to be placed to oppose to a circular plane portion of the thrust flange 9, and the lubricant 5 is also filled in a clearance between the thrust flange 9 and the thrust plate 10. A dynamic pressure generating groove is formed on at least one surface in the opposing surfaces of the thrust flange 9 and the thrust plate 10 to construct a thrust bearing portion 12, and a dynamic pressure generating groove is formed on at least one surface in the surface of the thrust flange 9 adjacent to the end portion of the shaft 4 and the surface of the sleeve 1 opposing to the surface of the thrust flange 9 to construct the thrust bearing portion 12.

When the shaft 4 is driven to rotate by the spindle motor part 3, pressure is applied to the lubricant 5 by oil feeding action of the dynamic pressure generating grooves of the radial bearing portion 6 and the thrust bearing portion 12, so that the shaft 4 is rotatably supported by the sleeve 1 in the posture having a predetermined amount of clearance.

A seal surface portion 8 is formed by being notched to a side of an outer periphery so as to have a larger clearance than the portion of the radial bearing portions 6, and the lubricant 5 is also stored in the clearance between the seal surface portion 8 and the outer peripheral surface of the shaft 4 even at the time of being driven to rotate.

Especially in the present invention, as shown in FIG. 2, the seal surface portion 8 is constructed by a first inclined surface 8a as an inclined surface adjacent to the radial bearing portion, which is formed adjacent to the radial bearing portion 6, and a second inclined surface 8b as a distant inclined surface which is formed at a side distant from the radial bearing portion 6 more than the first inclined surface 8a. An inclination angle α of the first inclined surface 8a in this seal surface portion 8 with respect to the shaft axis X from the side of the radial bearing portion 6 is formed to be larger than an inclination angle β (in FIG. 2, the intersecting portion of the second inclined surface 8b and the shaft axis X is outside the drawing, and therefore the inclination angle β with respect to the axis line parallel to the shaft axis X, which is the equivalent inclination angle, is shown) of the second inclined surface 8b with respect to the shaft axis X from the side of the radial bearing portion 6. For example, the inclination angle α of the first inclined surface 8a is set as a larger angle than 45 degrees, and the inclination angle β of the second inclined surface 8b is set as a smaller angle than 45 degrees. The first inclined surface 8a and the second inclined surface 8b in this seal surface portion 8 are each formed into a conical trapezoid shape without having uneven portions over the entire periphery in the location of the inner peripheral portion facing the open end 7 in the sleeve 1. Reference numeral and character 5a in FIG. 2 denotes a liquid level of the lubricant 5, and the lubricant 5 in such an amount as to exceed the first inclined surface 8a to contact the second inclined surface 8b is filled.

According to this constitution, the seal surface portion 8 is constituted by a plurality of inclined surfaces 8a and 8b, and the inclination angle α of the fist inclined surface 8a, which is formed adjacent to the radial bearing portion 6 in the portion in the seal surface portion 8, is formed to be large. Therefore, as compared with the case in which the entire seal surface portion 8 is constructed by a single inclined surface having the same inclination angle as the inclination angle β of the second inclined surface 8b, for example, a sufficient amount of lubricant 5 can be held in the seal surface portion 8. And even when the amount of lubricant 5 reduces as apart of the lubricant 5 evaporates or the like, the lubricant 5 stored in the seal surface portion 8 flows into the radial bearing portion 6 by capillarity, and the radial bearing portion 6 is always kept in the state filled with the lubricant 5, thus keeping the bearing performance favorable. The seal surface portion 8 has the shape which is wider toward the open end 7, thus also providing the effect of capable of reducing the amount of the liquid level 5a moving to the open end 7 (volume of the thermally expanded lubricant 5 moves toward the open end 7) when the lubricant 5 is thermally expanded at a high temperature. In addition, a depth L of the seal surface portion 8 from the open end 7 can be made small as compared with the case in which the entire seal surface portion 8 is constructed by a single inclined surface having the same inclination angle as the inclination angle β of the second inclined surface 8b, whereby the length dimension of the radial bearing portion 6 can be taken sufficiently, and high rotation accuracy and sufficient rigidity can be obtained. Further, the inclination angle β of the second inclined surface 8b which is formed adjacent to the open end 7 than the first inclined surface 8a is formed to be smaller, and therefore the centrifugal force acting on the lubricant 5 is restrained to be small at the time of being driven to rotate, thus making it possible to prevent the lubricant 5 from scattering to the outside and keeping favorable reliability.

The range in which the first inclined surface 8a is formed is suitably determined in accordance with the required amount of the lubricant 5, but it is preferable that a distance diameter direction dimension D of a connecting portion at the side of the second inclined surface 8b from the outer peripheral surface of the shaft 4 is more than twice as long as a distance diameter direction dimension d between the inner peripheral surface of the sleeve 1 and the outer peripheral surface of the shaft 4 in the location of the radial bearing portion 6, so that a sufficient oil amount can be secured in the location where the seal surface portion 8 is provided.

Figure 3:
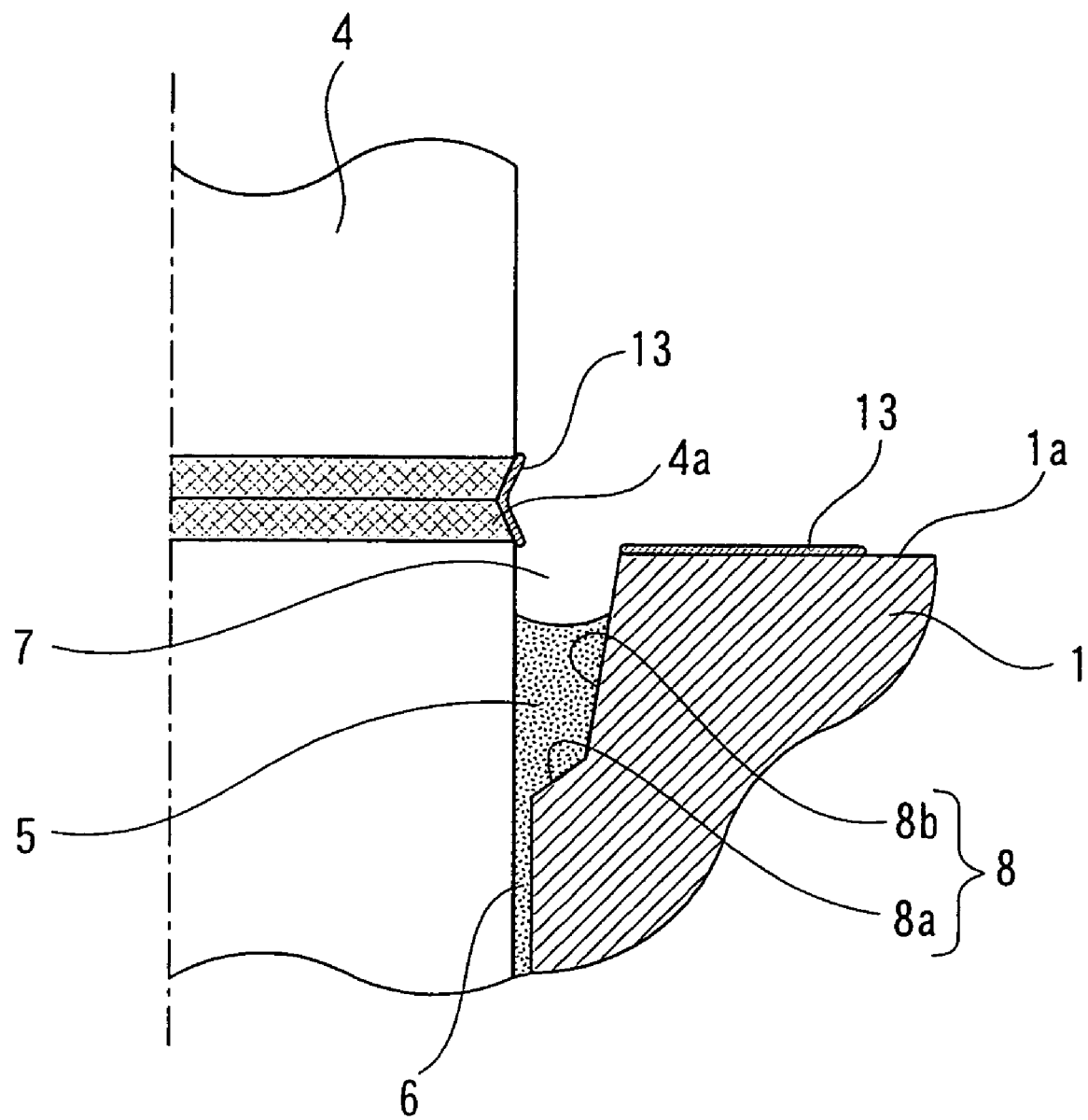
FIG. 3 is a partial cross-sectional front view of a fluid bearing device according to a second embodiment of the present invention.

In addition to the above-described constitution, as shown in FIG. 3, an oil repellent 13 for repelling the lubricant may be coated on a groove portion 4a with an approximately V-shaped section formed in a location in the shaft 4, which is exposed to the outside, and according to this, even when apart of the lubricant 5 goes along the outer peripheral surface of the shaft 4 to flow out, the lubricant 5 is repelled by the aforesaid oil repellent 13 and prevented from flowing to the outside. The oil repellent 13 may be coated on an end surface 1a provided with the open end 7, in the sleeve 1, and according to this, even when the lubricant 5 goes along the end surface 1a from the second inclined surface 8b in the sleeve 1 to flow to the outside, the lubricant 5 is repelled by the aforesaid oil repellent 13 and prevented from flowing to the outside.

Figure 4:
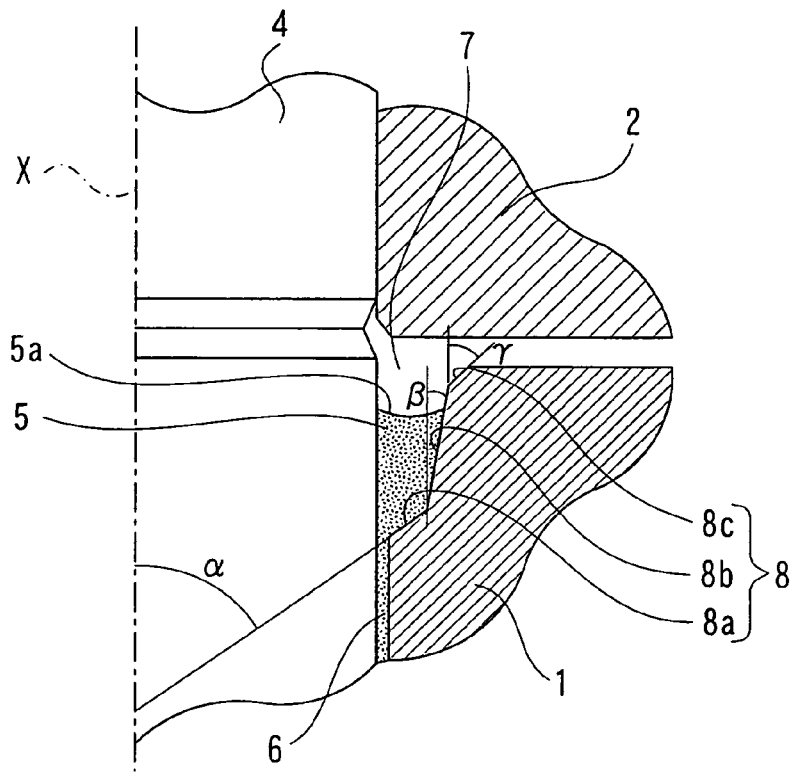
FIG. 4 is a partial cross-sectional front view of a fluid bearing device according to a third embodiment of the present invention.

In the above-described embodiment, the case in which the seal surface portion 8 is divided into two that are the first inclined surface 8a and the second inclined surface 8b is described, but the seal surface portion is not limited to this, and the seal surface portion 8 may be constructed by the inclined surface divided into three or more with respect to the direction of the shaft axis X. For example, as shown in FIG. 4, a third inclined surface 8c with a larger inclination angle γ than the inclination angle β of the second inclined surface 8b with respect to the shaft axis X from the side of the radial bearing portion 6 may be formed in a chamfered shape at the side more distant from the radial bearing portion 6 than the second inclined surface 8b. In FIG. 4, to make it easy to see, the inclination angle γ with respect to the axis line parallel to the shaft axis X, which is the equivalent inclination angle γ of the third inclined surface 8c and the shaft axis X, is shown. In this case, the second inclined surface 8b in the sleeve 1, and the end surface 1a provided with the open end 7 are connected relatively smoothly via the third inclined surface 8c, thus bringing about the advantage of being able to restrain occurrence of burrs in the connecting portion to the minimum in the cutting process of producing the sleeve 1. As shown in FIG. 2 to FIG. 4, the lubricant 5 in such an amount that the liquid level 5a exceeds the first inclined surface 8a to be in contact with the second inclined surface 8b is filled. The seal surface portion 8 may be further divided into four or more with respect to the shaft axis X, and in this case, the inclination angle of any specific inclined surface with respect to the shaft axis only has to be formed to be larger than the inclined angle of at least one distant inclined surface formed at the side more distant from the radial bearing portion than this specific inclined surface, and according to this constitution, the same operation and effects as described above can be obtained.

When the lubricant 5 is filled between the sleeve 1 and the shaft 4, a space including an area between the sleeve 1 and the shaft 4 is generally decompressed into a state near vacuum, and the lubricant 5 is filled from the open end 7 in the posture in which the open end 7 of the sleeve 1 is disposed on the top. The entire seal surface portion 8 is constructed by inclined surfaces 8a, 8b and 8c (or the inclined surfaces 8a and 8b) while a large amount of lubricant 5 can be held in the seal surface portion 8 as described above, thereby bringing about the advantage of being capable of introducing the lubricant 5 smoothly into the radial bearing portion 6 from the seal surface portion 8.

Figure 5:
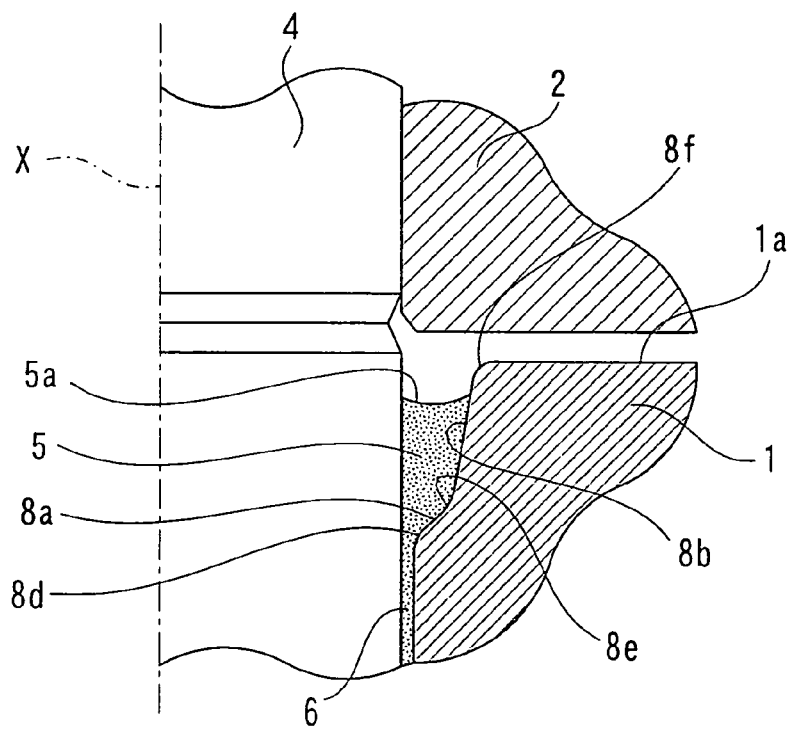
FIG. 5 is a partial cross-sectional front view of a fluid bearing device according to a fourth embodiment of the present invention.

As shown in FIG. 5, a connecting portion 8d of the radial bearing portion 6 and the first inclined surface 8a, a connecting portion 8e of the first inclined surface 8a and the second inclined surface 8b, a connecting portion 8f of the second inclined surface 8b and the sleeve end surface 1a and the like may be formed to have a gently-sloping sectional shape.

According to this constitution, in the cutting process of producing the sleeve 1, or the like, burrs can be approximately reliably prevented from occurring in the connecting portions 8d, 8e and 8f. There also exists the advantage that the lubricant 5 can be introduced into the radial bearing portion 6 from the seal surface portion 8 more smoothly.

Figure 6:
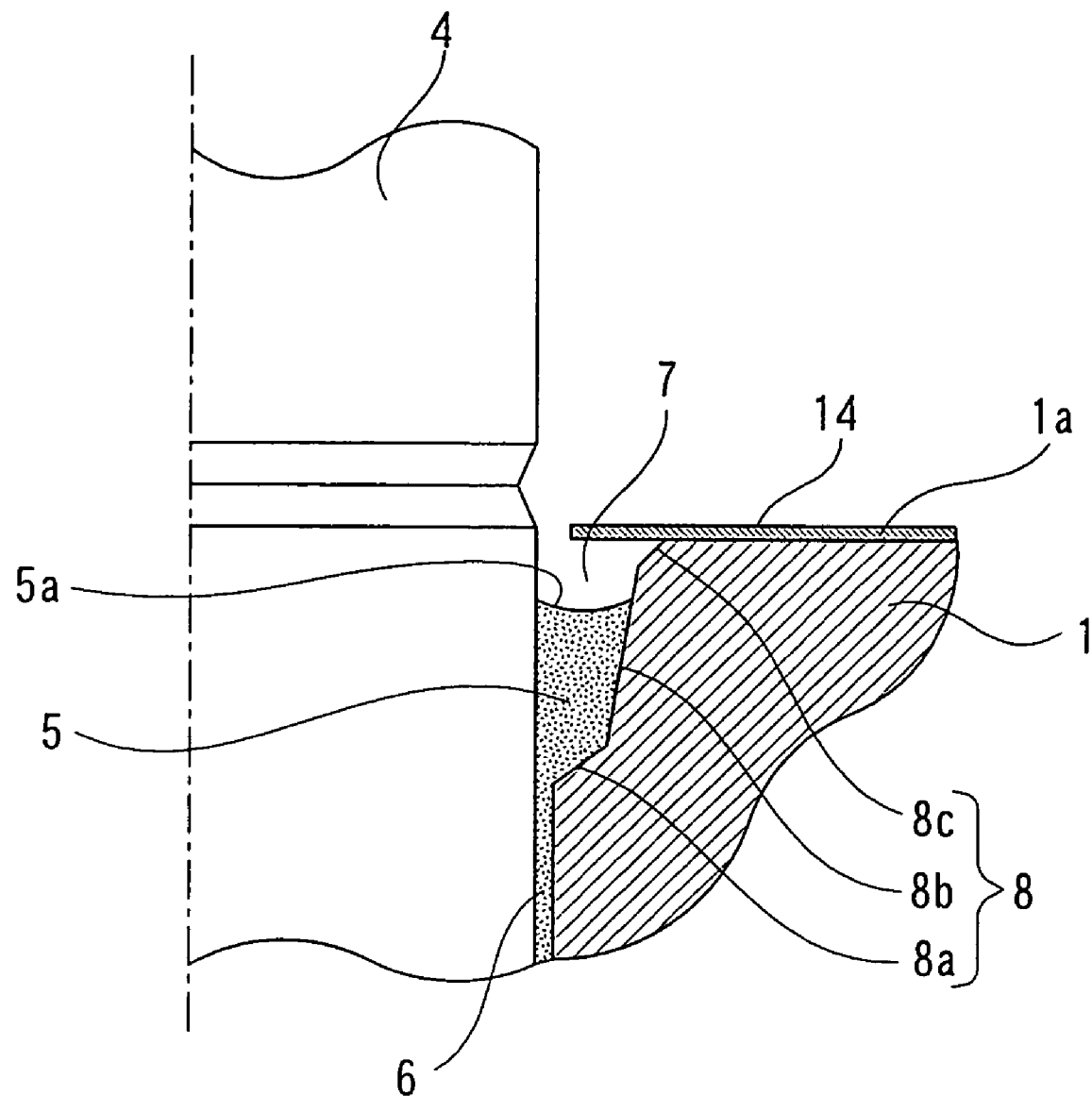
FIG. 6 is a partial cross-sectional front view of a fluid bearing device according to a fifth embodiment of the present invention.

Further, as shown in FIG. 6, a cover 14 for covering the open end 7 portion of the seal surface portion 8 may be fitted to the end surface 1a of the sleeve 1, and according to this constitution, the lubricant 5 can more reliably be prevented from scattering to the outside. According to this, the reliability of the bearing device is further enhanced. In this case, the oil repellant 13 may be also coated on the lower surface of the cover 14, which faces the seal surface portion 8, and according to this, the lubricant 5 can be prevented from being attached to the lower surface of the cover 14, thus further enhancing reliability.

In any embodiment, the seal surface portion 8 is formed into the conical trapezoid shape over the entire periphery in the location of the inner peripheral portion facing the open end 7 in the sleeve 1, namely, without having small uneven portions and the like which are at only one part, by the first inclined surface 8a and the second inclined surface 8b, or the first inclined surface 8a, the second inclined surface 8b and the third inclined surface 8c, thereby bringing about the advantage that when the lubricant 5 is introduced into the radial bearing portion 6 from the seal surface portion 8, the lubricant 5 can be flow into the radial bearing portion 6 more smoothly without the flow being inhibited by the uneven portion or the like.

Figure 7:
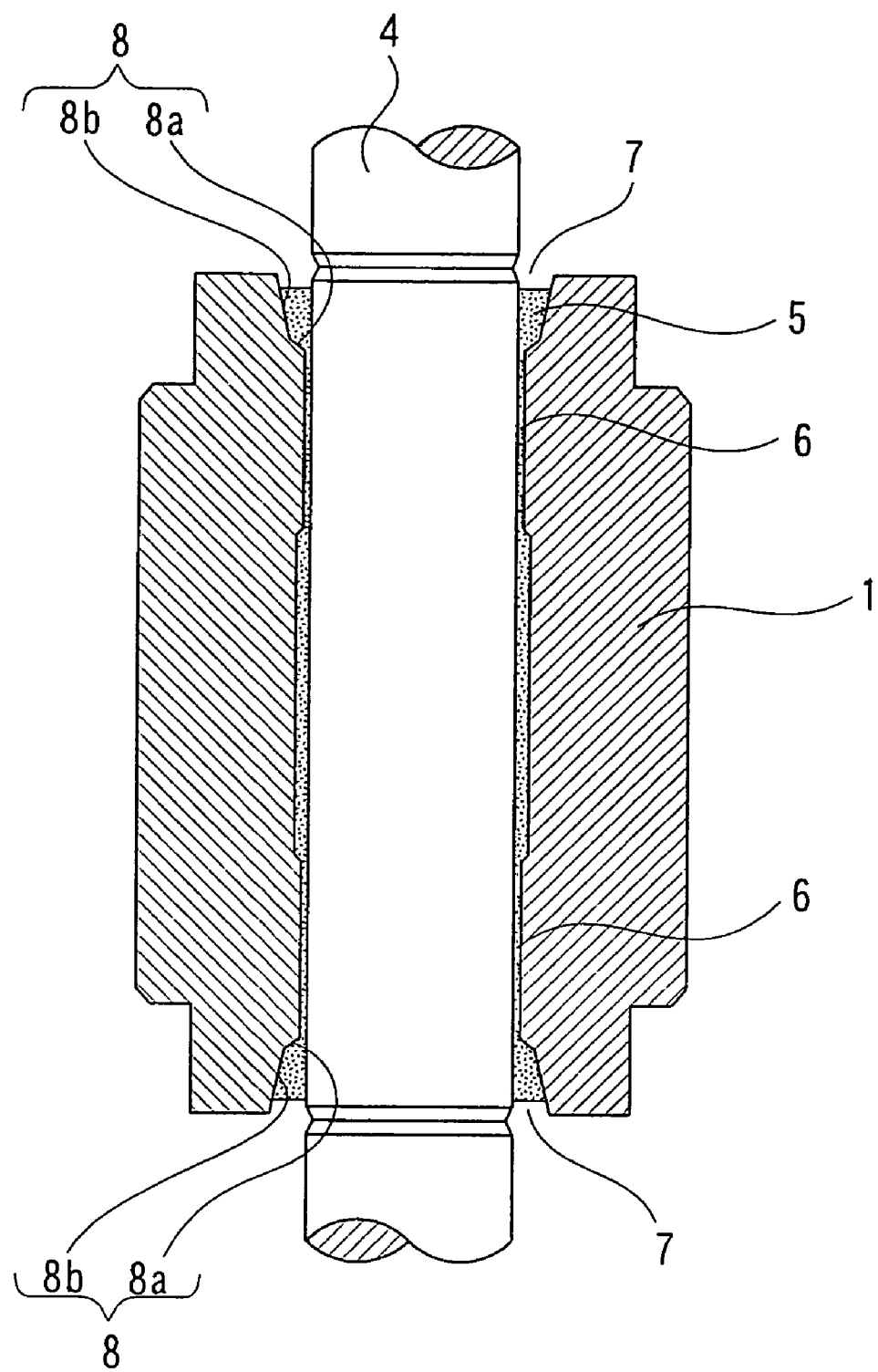
FIG. 7 is a partial cross-sectional front view of a fluid bearing device according to a sixth embodiment of the present invention.
Figure 8:
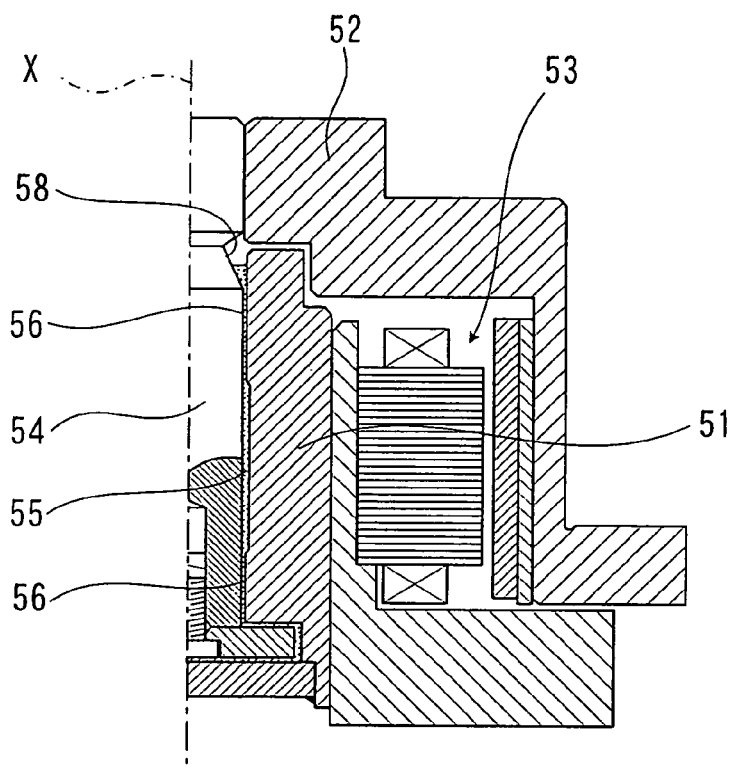
FIG. 8 is a cross-sectional front view of a conventional fluid bearing device.
Figure 9:
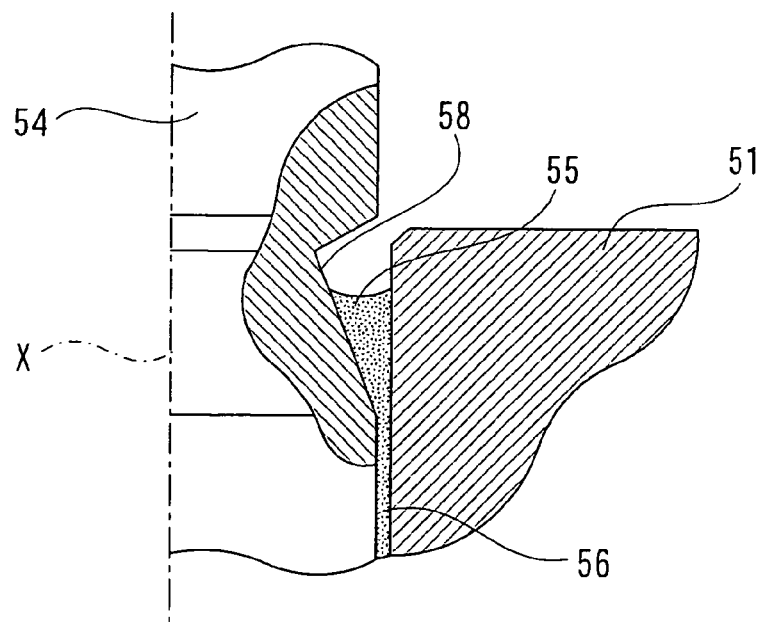
FIG. 9 is a partial cross-sectional front view of the same conventional fluid bearing device.
Figure 10:
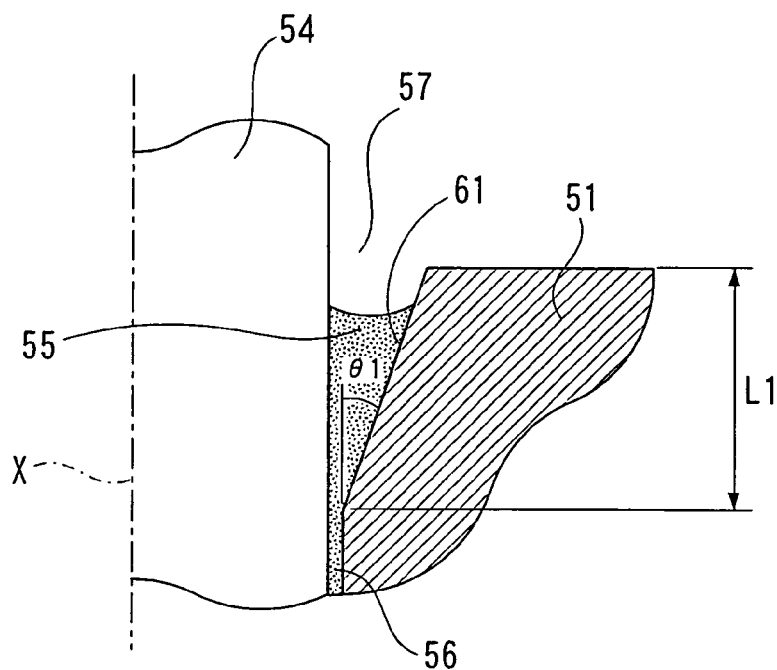
FIG. 10 is a partial cross-sectional front view of another conventional fluid bearing device.
Figure 11:
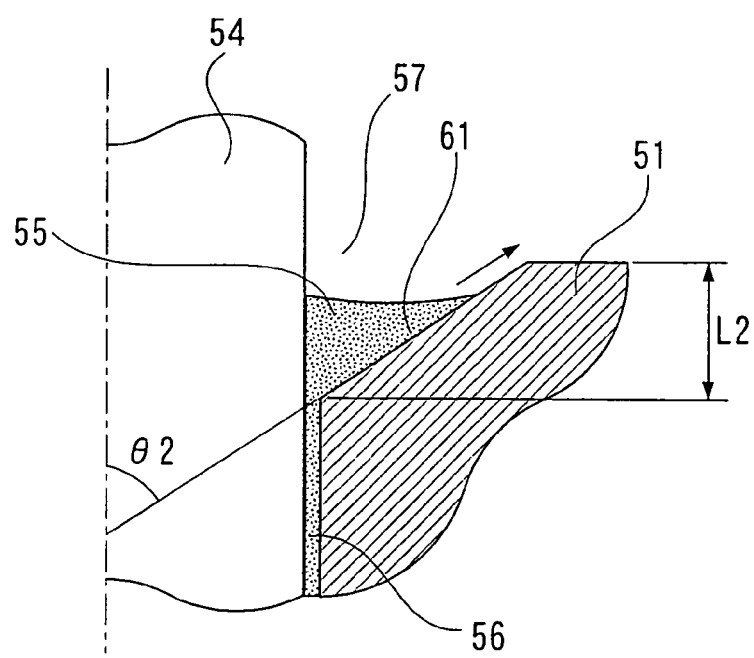
FIG. 11 is a partial cross-sectional front view of still another conventional fluid bearing device.

In the above-described embodiments, the case in which one side of the sleeve 1 is opened while the other end is closed, and only one end side of the shaft 4 is projected is described, and in this case, the seal surface portion 8 is provided at only one side of the sleeve 1. However, the present invention is not limited to this, and for example, as shown in FIG. 7 (in FIG. 7, the case having only a fluid bearing portion is shown), the present invention is applicable to the constitution in which both end portions of the shaft 4 are projected from both sides of the sleeve 1, and in this case, the seal surface portions 8 having the same plurality of inclined surfaces 8a, 8b and the like are formed at the inner peripheral surface facing the open ends 7 at the both ends of the sleeve 1.

What is claimed is:

1. A fluid bearing device, comprising:
   a sleeve;
   a shaft inserted into the sleeve via a predetermined clearance;
   a radial bearing portion for allowing the sleeve to rotatably support the shaft;
   a lubricant filled in the clearance between the shaft and the sleeve including the radial bearing portion; and
   a seal surface portion formed in the sleeve in a location facing an open end thereof, and having a larger clearance around the shaft than at the radial bearing portion, the clearance around the shaft being filled with the lubricant, wherein
   the seal surface portion has a sectional shape defined by a plurality of inclined surfaces including an inclined surface adjacent to the radial bearing portion and at least one inclined surface distant from the radial bearing portion, and
   the adjacent inclined surface forms an inclination angle with respect to the shaft axis, and the distant inclined surface forms an inclination angle with respect to the shaft axis, the former angle being larger than the latter angle, and
   an oil repellent for repelling the lubricant coated on an annular groove portion in the shaft exposed to the outside, said groove portion located above the seal surface portion.

2. The fluid bearing device according to claim 1, further comprising a cover for covering an opening of the seal surface portion, the cover being fitted on an end surface of the sleeve.

3. The fluid bearing device according to claim 1, wherein said groove portion comprises a V-shaped section formed in the shaft.

4. A fluid bearing device, comprising:
   a sleeve;
   a shaft inserted into the sleeve via a predetermined clearance;
   a radial bearing portion for allowing the sleeve to rotatably support the shaft;
   a lubricant filled in the clearance between the shaft and the sleeve including the radial bearing portion; and
   a seal surface portion formed in the sleeve in a location facing an open end thereof, and having a larger clearance around the shaft than at the radial bearing portion, the clearance around the shaft being filled with the lubricant, wherein
   the seal surface portion has a sectional shape defined by a plurality of inclined surfaces including an inclined surface adjacent to the radial bearing portion and at least one inclined surface distant from the radial bearing portion, and
   the adjacent inclined surface forms an inclination angle with respect to the shaft axis, and the distant inclined surface forms an inclination angle with respect to the shaft axis, the former angle being larger than the latter angle, and
   connecting portions formed between the radial bearing portion and the inclined surface adjacent to the radial bearing portion, between the adjacent inclined surface and the inclined surface distant from the radial bearing portion, and between the distant inclined surface and an end surface of the sleeve have gently curving shapes.

5. The fluid bearing device according to claimed 4, wherein the seal surface portion has a sectional shape defined by a plurality of inclined surfaces including a first inclined surface adjacent to the radial bearing portion and a second inclined surface adjacent to the first inclined surface,
   the first inclined surface forming a first inclination angle α with respect to the shaft axis, and the second inclined surface forming a second inclination angle β with respect to the shaft axis, the first angle α being larger than the second angle β, and the first angle α being larger than 45 degrees.

* * * * *